United States Patent
O'Sullivan et al.

(10) Patent No.: US 8,892,657 B2
(45) Date of Patent: Nov. 18, 2014

(54) MOTIVATING AND DEMOTIVATING MESSAGE RESPONSES

(75) Inventors: Patrick O'Sullivan, Dublin (IE); Gary Denner, Co. Kildare (IE); Ruthie D. Lyle, Durham, NC (US); Cynthia E. Barber-Mingo, Westford, MA (US); Carol S. Zimmet, Boxborough, MA (US)

(73) Assignee: International Business Machines Corporation, Armonk, NY (US)

( * ) Notice: Subject to any disclaimer, the term of this patent is extended or adjusted under 35 U.S.C. 154(b) by 876 days.

(21) Appl. No.: 11/557,556

(22) Filed: Nov. 8, 2006

(65) Prior Publication Data

US 2008/0109516 A1    May 8, 2008

(51) Int. Cl.
G06F 15/16    (2006.01)
G06Q 10/10    (2012.01)

(52) U.S. Cl.
CPC .................................. *G06Q 10/107* (2013.01)
USPC ............................. 709/206; 709/207; 709/228

(58) Field of Classification Search
USPC .......................................... 709/205, 206, 207
See application file for complete search history.

(56) References Cited

U.S. PATENT DOCUMENTS

| | | | |
|---|---|---|---|
| 6,618,748 B1 * | 9/2003 | Bates et al. | 709/206 |
| 2003/0195937 A1 * | 10/2003 | Kircher et al. | 709/207 |
| 2004/0141004 A1 | 7/2004 | Cabezas et al. | |
| 2005/0108336 A1 * | 5/2005 | Naick et al. | 709/206 |
| 2005/0193145 A1 * | 9/2005 | Brown et al. | 709/238 |
| 2005/0223063 A1 | 10/2005 | Chang et al. | |

FOREIGN PATENT DOCUMENTS

| | | | |
|---|---|---|---|
| WO | WO 9408419 A1 * | 4/1994 | |
| WO | 2004086250 A1 | 10/2004 | |

OTHER PUBLICATIONS

Victoria Bellotti†; FLANNEL: Adding computation to electronic mail during transmission;2002;ACM; 4; 1-9.*

* cited by examiner

*Primary Examiner* — Evans Desrosiers
(74) *Attorney, Agent, or Firm* — Steven M. Greenberg, Esq.; CRGO Law

(57) ABSTRACT

Embodiments of the present invention address deficiencies of the art in respect to message response management and provide a method, system and computer program product for motivating and de-motivating message responses. In one embodiment of the invention, a message reply motivation and de-motivation method can be provided. The method can include composing a message, addressing the message to at least one addressee, associating a reply preference specifying whether or not a recipient is to reply to the message, and forwarding the reply preference to the addressee. Upon receipt, the message can be displayed in a message viewer, and any reply preference for the message can be analyzed to determine if the reply preference specifies whether or not to reply to the message. Thereafter, the reply preference can be applied in the message viewer.

18 Claims, 3 Drawing Sheets

MOTIVATING AND DEMOTIVATING MESSAGE RESPONSES

BACKGROUND OF THE INVENTION

1. Field of the Invention

The present invention relates to the field of messaging and more particularly to message delivery management for electronic messages.

2. Description of the Related Art

Electronic messaging represents the single most useful task accomplished over wide-scale computer communications networks. Some argue that in the absence of electronic messaging, the Internet would have amounted to little more than a science experiment. Today, electronic messaging seems to have replaced the ubiquitous telephone and fax machine for the most routine of interpersonal communications. As such, a variety of electronic messaging systems have arisen which range from real-time instant messaging systems and wireless text pagers to asynchronous electronic mail systems.

Electronic mail, a form of electronic messaging referred to in the art as e-mail, has proven to be the most widely used computing application globally. Though e-mail has been a commercial staple for several decades, due to the explosive popularity and global connectivity of the Internet, e-mail has become the preferred mode of communications, regardless of the geographic separation of communicating parties. Today, more e-mails are processed in a single hour than phone calls. Clearly, e-mail as a mode of communications has been postured to replace all other modes of communications, save for voice telephony.

Modern electronic messaging clients provide a "reply" function which permits the composition of a message by a composer in reply to a message received by the composer. By selecting the reply option, a new message window can open addressed to the sender of the received message. Notably, where the received message had been addressed to multiple recipients in addition to the composer, a "reply-all" function permits the addressing of a reply message to all recipients designated by the original received message. Thus, the reply-all operation can be an efficient mechanism where all addresses of a received message are intended to receive a reply from the composer.

The widespread usage of e-mail has resulted in effortless communications among users. Notwithstanding, the ability to readily communicate with a number of people with little effort is not without its problems. For one, reviewing an e-mail inbox chock full of messages can be tedious when the number of messages becomes excessive. The volume of messages in an inbox can be compounded when many messages are not original transmissions from sender to recipient, but replies to messages previously sent.

In this regard, where one message has been addressed to a multiplicity of recipients, the reply by each recipient can readily overcome an inbox. For smaller e-mail distribution lists, receiving replies from different addressees can be desirable. In contrast, for informational messages sent to a large set of addressees, receiving a reply from a large number of the addressees can supply little added value to the message exchange while undesirably clogging the inbox of the sender. Yet, the addressees of a message cannot be faulted as there is no way to know whether the sender prefers a reply to the message or not.

BRIEF SUMMARY OF THE INVENTION

Embodiments of the present invention address deficiencies of the art in respect to message response management and provide a novel and non-obvious method, system and computer program product for motivating and de-motivating message responses. In one embodiment of the invention, a message reply motivation and de-motivation method can be provided. The method can include composing a message, addressing the message to at least one addressee, associating a reply preference specifying whether or not a recipient is to reply to the message, and forwarding the reply preference to the addressee. Upon receipt, the message can be displayed in a message viewer, and any reply preference for the message can be analyzed to determine if the reply preference specifies whether or not to reply to the message. Thereafter, the reply preference can be applied in the message viewer.

Where a reply preference indicates that an addressee is to reply to the message, a reminder can be provided to the addressee to reply to the message. Alternatively, a to-do can be created reminding the addressee to reply to the message in a personal information manager for the addressee. Optionally, a threshold period of time can be established for the addressee to reply to the message and, subsequent to the lapse of the threshold period of time, the message can be moved to a respond folder indicating to the addressee to reply to the message. As yet another option, a response to a prompt requesting a reply to the message can be solicited, and the response can be returned to a sender of the message in a return receipt for the message.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the present invention provide a method, system and computer program product for motivating and de-motivating messaging responses in a messaging system. In accordance with an embodiment of the present invention, composed messages can be associated with a reply preference. The reply preference can range from no reply permitted to a required reply, and can include selected reply preferences for individual addressees amongst a group of addressees. When viewing a message associated with a reply preference, the reply preference can be applied and a reply can be motivated or de-motivated as the case may be, including expressly soliciting a reply from a designated addressee.

Figure 1:
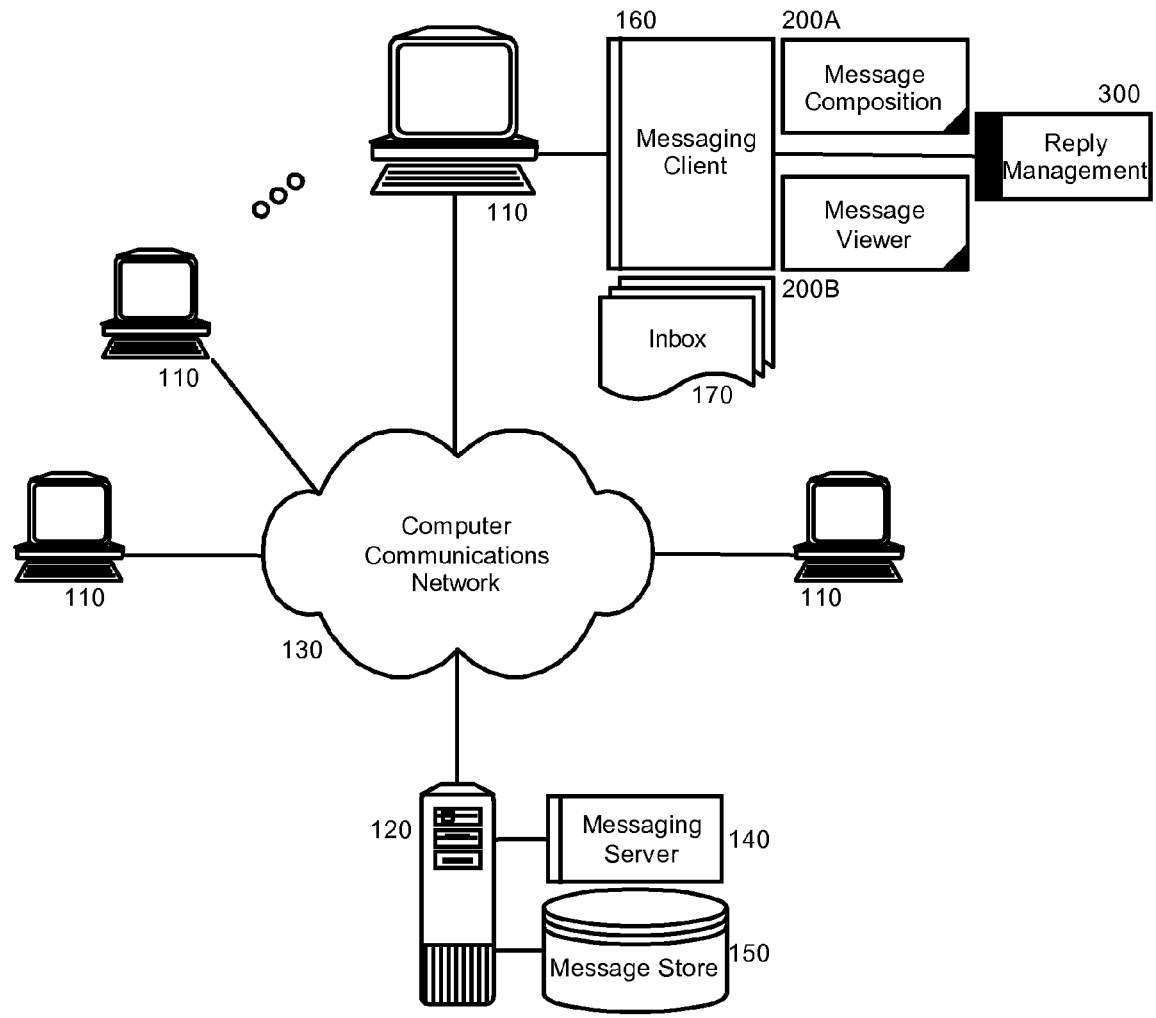
FIG. 1 is a schematic illustration of a messaging data processing system configured for motivating and de-motivating message responses.

In further illustration, FIG. 1 is a schematic illustration of a messaging data processing system configured for motivating and de-motivating message responses. The system can include one or more messaging client computing platforms 110 coupled to a messaging server computing platform 120 over a computer communications network 130. The messaging server computing platform 120 can be coupled to a message store 150 and can include a configuration enabled to support the operation of a messaging server 140. In this regard, the messaging server 140 can include an e-mail server programmed to manage the transmission and receipt of e-mail messages on behalf of one or more e-mail users associated with corresponding ones of the messaging client computing platforms 110.

Each of the messaging client computing platforms 110 can include a messaging client 160. The messaging client 160 can include an e-mail messaging client application enabled to manage the receipt of e-mail messages in a coupled inbox 170, and to manage the composition and transmission of e-mail messages to designated addressees associated with corresponding ones of the messaging client computing platforms 110. To that end, the messaging client 160 can be coupled to a message composition module 200A and a message viewer module 200B. Importantly, reply management logic 300 can be coupled to the messaging client 160 and can facilitate the management of reply preferences for a message in the messaging client 160.

In operation, messages can be composed and designated for receipt by one or more addressees through message composition module 200A. Prior to selecting the transmission of the message to the addressees, the program code of the reply management logic 300 can establish a reply preference for any or all of the designated addressees. The reply preference can range from no reply requested or permitted to reply requested or required. The reply preference can be associated with the message as the message is delivered to each of the addressees. Upon receipt of a message associated with a reply preference, the program code of the reply management logic 300 can enforce the reply preference, including posting a message to the recipient of the message expressing the reply preference, or requiring or disallowing a reply to the message.

Figure 2:
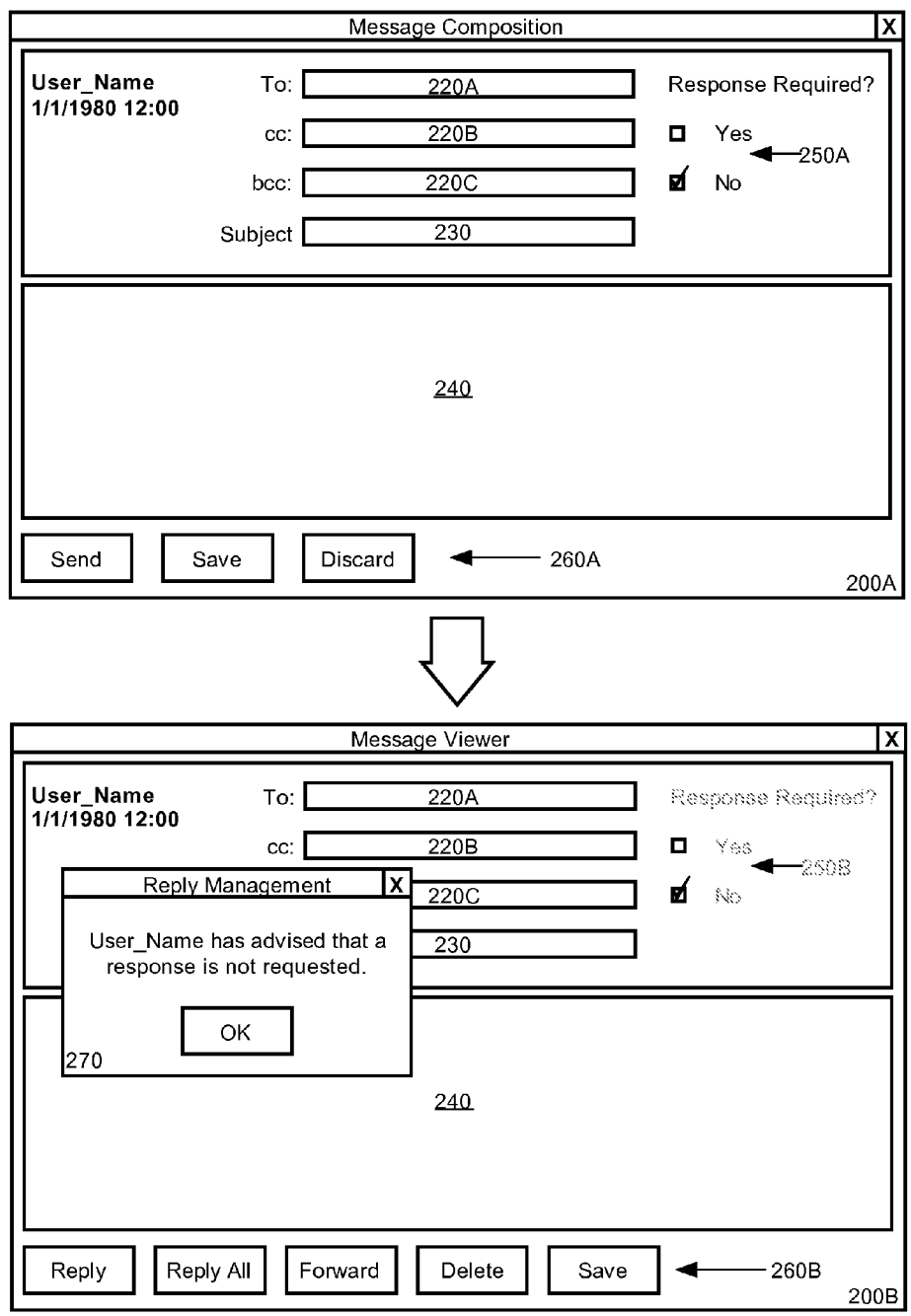
FIG. 2 is a pictorial illustration of an exemplary messaging system user interface configured for motivating and de-motivating message responses; and, FIGS. 3A and 3B, taken together, are a flow chart illustrating a process for motivating and de-motivating message responses in a messaging system.

In yet further illustration, FIG. 2 is a pictorial illustration of an exemplary messaging system user interface configured for motivating and de-motivating message responses. As shown in FIG. 2, a message composition module 200A can provide a user interface through which messages can be composed and transmitted to one or more designated addressees. The user interface of the message composition module 200A can include one or more addressee fields 220A, 220B, 220C into which one or more addressees can be designated. A message body field 240 further can be provided as can a subject field 230 into which a subject can be specified for the message. Notably, reply preferences 250A can be specified for the message, for an individual addressee, or for a group of addressees. Additionally, one or more message transmission controls 260A further can be provided.

Like the message composition module 200A, a message viewer module 200B also can be provided. The user interface of the message viewer module 200B can provide a viewing of a received message including an indication of sender of the message and the addressees of the received message. Additionally, the user interface of the message viewer module 200B can provide message receipt controls 260B including controls for replying to the received message, for forwarding the received message, for deleting the received message, and for saving the received message. Importantly, the user interface of the message viewer module 200B yet further can provide an indication of a reply preference 250B for the received message and a prompt 270 indicating the reply preference for the received message.

Figure 3A:
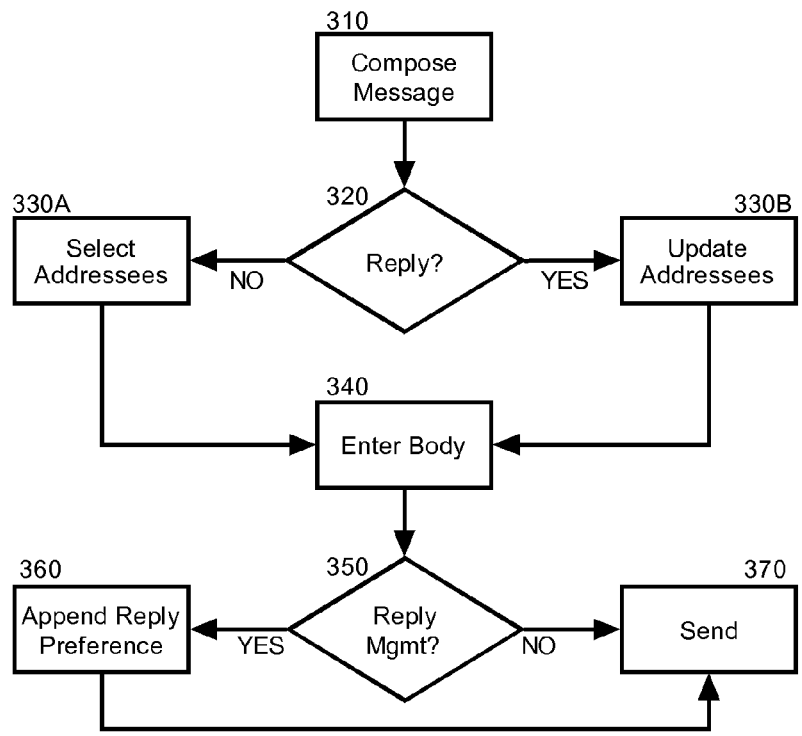

Turning now to FIG. 3A, a flow chart is shown illustrating a process for applying a reply preference to a composed message. Beginning in block 310, a message can be composed and in decision block 320, it can be determined whether the message is a reply to a previously received message, or whether the message is a newly composed message. In the latter circumstance, in block 330A one or more addressees can be selected for the message. In the former circumstance, in block 330B, zero or more of the existing addressees can be updated 330B In either case, in block 340, the body of the message can be provided.

In decision block 350, it can be determined whether or not to apply one or more reply preferences to the message. If so, in block 360, one or more reply preferences can be specified for the message. The reply preferences can range from advisory preferences indicating whether or not a reply is desired, to rules specifying for the message in general, or any set of addressees, whether a reply is permitted or required. Thereafter, in block 370, the message along with any reply preferences can be forwarded to the designated addressees.

Figure 3B:
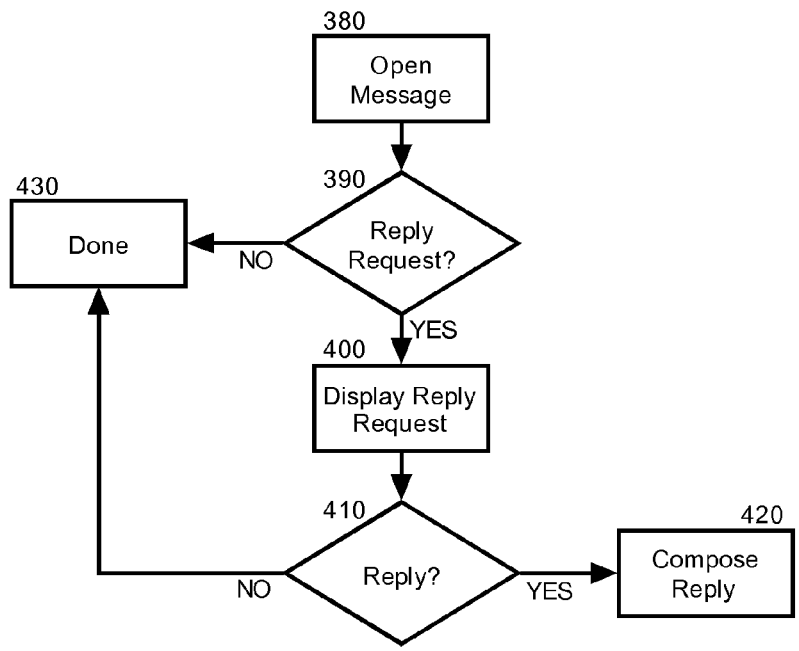

Turning now to FIG. 3B, in block 380 a received message can be opened for viewing. In decision block 390, it can be determined whether a reply preference has been associated with the message. If so, in block 400, the reply preference can be presented in an advisory capacity. Optionally, the reply preference can be enforced as a rule in as much as the user interface displaying the message can be adapted to conform to the reply preference such as by graying out a reply option where none is permitted. In any case, in decision block 410, if a reply has been solicited, in block 420 a reply can be composed. Otherwise, the process can end in block 430.

Embodiments of the invention can take the form of an entirely hardware embodiment, an entirely software embodiment or an embodiment containing both hardware and software elements. In a preferred embodiment, the invention is implemented in software, which includes but is not limited to firmware, resident software, microcode, and the like. Furthermore, the invention can take the form of a computer program product accessible from a computer-usable or computer-readable medium providing program code for use by or in connection with a computer or any instruction execution system.

For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

We claim:

1. A message reply motivation and de-motivation method comprising:
   composing a message in a messaging client of a messaging client computing platform;
   addressing the message to at least one addressee;
   associating a reply preference with the message, the reply preference including specifying the reply preference for the message, an individual addressee, and a group of addressees and also specifying whether or not a recipient is to reply to the message;
   forwarding the reply preference with the message to the at least one addressee from the messaging client over a computer communications network, the reply preference causing a visual presentation of the reply preference to the at least one addressee in a message viewer of a mail messaging client of the at least one addressee and also a prompting of the at least one addressee in the mail messaging client to reply to the message according to the reply preference;
   waiting a threshold period of time for the at least one addressee to reply to the message where the reply preference specifies that the at least one addressee is to reply to the message; and,
   subsequent to the threshold period of time, moving the message to a respond folder indicating to the at least one addressee to reply to the message.

2. The method of claim 1, further comprising:
   receiving the message;
   displaying the message in a message viewer;
   detecting the reply preference for the message;
   determining whether the reply preference specifies whether or not to reply to the message; and,
   applying the reply preference in the message viewer.

3. The method of claim 2, wherein applying the reply preference in the message viewer, comprises modifying the message viewer to enforce the reply preference.

4. The method of claim 1, wherein associating the reply preference specifying whether or not the recipient is to reply to the message, comprises associating the reply preference specifying whether or not the recipient is permitted to reply to the message.

5. The method of claim 1, wherein the prompting indicates the reply preference in an advisory capacity.

6. The method of claim 5, further comprising:
   soliciting a response to the prompt; and,
   returning the response to a sender of the message in a return receipt for the message.

7. The method of claim 1, further comprising providing a reminder to the at least one addressee to reply to the message where the reply preference specifies that the at least one addressee is to reply to the message.

8. The method of claim 1, further comprising creating a to-do reminding the at least one addressee to reply to the message in a personal information manager for the at least one addressee where the reply preference specifies that the at least one addressee is to reply to the message.

9. A reply motivating and de-motivating message data processing system comprising:
   a messaging client disposed in memory of a messaging client computing platform configured for coupling to a messaging server over a computer communications network;
   a message viewer module in the memory of the messaging client computing platform and coupled to the messaging client, the message viewer module displaying messages received in the messaging client;
   a messaging composition module in the memory of the messaging client computing platform and coupled to the messaging client, the messaging composition module comprising program code enable upon execution by a processor of the messaging client computing platform to compose a message in the messaging client, to address the message to at least one addressee, to associate a reply preference with the message, the reply preference including specifying the reply preference for the message, an individual addressee, and a group of addressees and also specifying whether or not a recipient is to reply to the message, and to forward the reply preference with the message to the at least one addressee; and,
   reply management logic in the memory of the messaging client computing platform and coupled to the message viewer module, the reply management logic comprising program code enabled upon execution by the processor of the messaging client computing platform to determine whether the reply preference for a received message specifies whether or not to reply to the received message, to apply the reply preference to the received message by displaying the reply preference in the message viewer module in connection with the received message, to display a prompt in the message viewer module to reply to the received message according to the reply preference, to wait a threshold period of time for the at least one addressee to reply to the message where the reply preference specifies that the at least one addressee is to reply to the message, and subsequent to the threshold period of time, to move the message to a respond folder indicating to the at least one addressee to reply to the message.

10. The system of claim 9, wherein the message is an e-mail.

11. A computer program product comprising a computer usable storage memory having computer usable program code for message reply motivation and de-motivation, the computer program product including:
    computer usable program code for composing a message in a messaging client;
    computer usable program code for addressing the message to at least one addressee;
    computer usable program code for associating a reply preference with the message, the reply preference including specifying the reply preference for the message, an individual addressee, and a group of addressees and also specifying whether or not a recipient is to reply to the message;
    computer usable program code for forwarding the reply preference with the message to the at least one addressee from the messaging client over a computer communications network, the reply preference causing a visual presentation of the reply preference to the at least one addressee in a message viewer of a mail messaging client of the at least one addressee and also a prompting of the at least one addressee in the mail messaging client to reply to the message according to the reply preference;

computer usable program code for waiting a threshold period of time for the at least one addressee to reply to the message where the reply preference specifies that the at least one addressee is to reply to the message; and, computer usable program code for subsequent to the threshold period of time, moving the message to a respond folder indicating to the at least one addressee to reply to the message.

12. The computer program product of claim 11, further comprising:

computer usable program code for receiving the message;

computer usable program code for displaying the message in a message viewer;

computer usable program code for detecting the reply preference for the message;

computer usable program code for determining whether the reply preference specifies whether or not to reply to the message; and, computer usable program code for applying the reply preference in the message viewer.

13. The computer program product of claim 12, wherein the computer usable program code for applying the reply preference in the message viewer, comprises computer usable program code for prompting indicates the reply preference in an advisory capacity.

14. The computer program product of claim 13, further comprising:

computer usable program code for soliciting a response to the prompt; and, computer usable program code for returning the response to a sender of the message in a return receipt for the message.

15. The computer program product of claim 12, wherein the computer usable program code for applying the reply preference in the message viewer, comprises computer usable program code for modifying the message viewer to enforce the reply preference.

16. The computer program product of claim 11, wherein the computer usable program code for associating the reply preference specifying whether or not the recipient is to reply to the message, comprises computer usable program code for associating the reply preference specifying whether or not the recipient is permitted to reply to the message.

17. The computer program product of claim 11, further comprising computer usable program code for providing a reminder to the at least one addressee to reply to the message where the reply preference specifies that the at least one addressee is to reply to the message.

18. The computer program product of claim 11, further comprising computer usable program code for creating a to-do reminding the at least one addressee to reply to the message in a personal information manager for the at least one addressee where the reply preference specifies that the at least one addressee is to reply to the message.

* * * * *